US00RE43388E

(19) United States
(12) Reissued Patent
Strickler et al.

(10) Patent Number: US RE43,388 E
(45) Date of Reissued Patent: May 15, 2012

(54) SILVER-FREE LOW-E SOLAR CONTROL COATING

(75) Inventors: David A. Strickler, Toledo, OH (US); Srikanth Varanasi, Toledo, OH (US)

(73) Assignee: Pilkington North America, Inc., Toledo, OH (US)

(21) Appl. No.: 13/134,737

(22) Filed: Jun. 15, 2011

Related U.S. Patent Documents

Reissue of:

(64) Patent No.: 7,875,357
Issued: Jan. 25, 2011
Appl. No.: 11/988,479
PCT Filed: Jul. 25, 2006
PCT No.: PCT/US2006/028777
§ 371 (c)(1),
(2), (4) Date: Jan. 13, 2009
PCT Pub. No.: WO2007/016069
PCT Pub. Date: Feb. 8, 2007

(51) Int. Cl.
*B32B 9/00* (2006.01)

(52) U.S. Cl. ..... 428/432; 428/689; 428/698; 428/699; 428/701; 428/702

(58) Field of Classification Search ..... 428/428, 428/432, 689, 697, 698, 699, 701, 702
See application file for complete search history.

(56) References Cited

U.S. PATENT DOCUMENTS

| | | | | | |
|---|---|---|---|---|---|
| 4,000,346 | A * | 12/1976 | Dowell | 428/336 |
| 4,187,336 | A * | 2/1980 | Gordon | 428/34 |
| 4,206,252 | A * | 6/1980 | Gordon | 427/160 |
| 4,419,386 | A * | 12/1983 | Gordon | 427/109 |
| 5,520,996 | A * | 5/1996 | Balian et al. | 428/216 |
| 5,798,142 | A * | 8/1998 | Soubeyrand | 427/255.18 |
| 5,840,364 | A * | 11/1998 | Takeda et al. | 427/160 |
| 6,218,018 | B1 * | 4/2001 | McKown et al. | 428/432 |
| 6,268,059 | B1 * | 7/2001 | Cronin et al. | 428/432 |
| 6,416,890 | B1 * | 7/2002 | Terneu et al. | 428/701 |
| 6,592,996 | B1 * | 7/2003 | Kunisada et al. | 428/432 |
| 6,846,556 | B2 * | 1/2005 | Boire et al. | 428/325 |

FOREIGN PATENT DOCUMENTS

| | | | |
|---|---|---|---|
| EP | 0 779 343 | A2 * | 6/1997 |
| EP | 0 983 972 | A2 * | 8/2000 |
| JP | 06144874 | A * | 5/1994 |
| WO | WO 2005/073428 | A1 * | 8/2005 |

* cited by examiner

*Primary Examiner* — Gwendolyn Blackwell
(74) *Attorney, Agent, or Firm* — Marshall & Melhorn, LLC

(57) ABSTRACT

A multi-layer, low-emissivity, solar control article comprises a dielectric substrate, a first dielectric metal oxide layer deposited on the substrate, a first highly conductive, silver-free metal oxide layer deposited on the first dielectric metal oxide, and a second dielectric metal oxide deposited on the first highly conductive, silver-free metal oxide layer. The aforementioned coating layer sequence may be repeated as necessary to achieve the desired properties. An iridescence suppressing interlayer may, optionally, be utilized in connection with the low-emissivity, solar control coating.

9 Claims, No Drawings

SILVER-FREE LOW-E SOLAR CONTROL COATING

Matter enclosed in heavy brackets [ ] appears in the original patent but forms no part of this reissue specification; matter printed in italics indicates the additions made by reissue.

BACKGROUND OF THE INVENTION

Conventionally, solar control, low-e films made by various deposition processes, e.g., sputtering, have consisted of one or more layers of a conductive metal, such as silver, sandwiched between layers of dielectric materials. The dielectric materials isolate the conductive metal layer(s) and prevent, or at least minimize, undesirable oxidation of the conductive metal. While such film stacks, in various configurations, have been found to provide coatings exhibiting good low-emissivity and solar control properties, they are also known to have poor chemical and mechanical durability, thus increasing the risk of damage to the coating from exposure to atmospheric humidity or scratching from normal handling activities.

Improvement of the physical and chemical durability of silver-containing films has been attempted by others. These effects include varying the composition of the dielectric layers, dividing individual dielectric layers into sub-layers of different dielectric materials, alloying the silver with other metals, and various methods of modifying so-called "sacrificial" layers between the silver and dielectric layers.

Thus, those skilled in the art of thin film design and coated product manufacturing have continued to search for a thin film structure which has good emissivity and solar control properties, but which is superior in both chemical and mechanical durability.

SUMMARY OF THE INVENTION

The present invention comprises a low-emissivity, solar control coating deposited on a dielectric substrate, the coating comprising a first dielectric metal oxide layer deposited on the dielectric substrate; a first highly conductive, silver-free metal oxide layer deposited on the first dielectric metal oxide, the highly conductive metal oxide having an electrical conductivity greater than 10,000 $ohm^{-1}$ $cm^{-1}$; and a second dielectric metal oxide layer deposited on the first highly conductive, silver-free metal oxide layer.

DETAILED DESCRIPTION OF THE PREFERRED EMBODIMENTS

The present invention utilizes the well-known concept of induced transmission filters to form a thin film coating structure comprising one or more highly electrically conductive metal oxide layers, rather than conductive metal layers. The present structure further comprises a layer of a dielectric metal oxide on either side of the highly conductive metal oxide layer. This sequence of layers may be repeated as necessary to achieve the emissivity and solar control properties desired.

The choice of the highly conductive metal oxides and the dielectric metal oxides, as well as the thickness of the layers in which such oxides are deposited, are important to achieving the sought-after combination of low-emissivity, high visible transmission, high IR reflection/absorption, mechanical durability, chemical stability, and in particular, good solar control.

In this connection, dielectric metal oxides useful for the present invention include, oxides of tin, titanium, zinc, bismuth, and alloys of such oxides. Nitrides of silicon may also be useful for the present invention. Layer thicknesses of such dielectric metal oxides suitable for the invention are in the range of 200 to 400 Å, preferably, 250-350 521 .

The highly conductive metal oxides useful for the present invention include simple oxides such as oxides of rhenium, ruthenium, iridium, chromium and molybdenum perovskite type mixed oxides, including CaRuO3, SrRuO3, SrVO3, SrCrO3, SrFeO3, SrTiO3, SrMoO3, CaVO3, LaTiO3, $Sr_2VMoO_6$; spinel type mixed oxides, such as NiCo2O4; heavily doped tungsten oxide bronzes, such as $Na_xWO3$ (where x+>0.40). Layer thicknesses of the aforementioned highly conductive metal oxides suitable for the invention are less than 1000 Å, preferably less than 500 Å.

Table 1 shows some exemplary electrical resistively and electrical conductivity values for commonly used highly conductive metals, i.e., Ag and Cu, as well as highly conductive metal oxides suitable for use in connection with the present invention, i.e., $ReO_3$, $Na_{0.8}WO_3$ and $RuO_2$. Although the conductivities of the exemplary highly conductive metal oxides are substantially lower than the conductivities of Ag and Cu, the metal oxides shown in Table 1 have been found to perform satisfactorily from an electrical conductivity viewpoint, and to display the other desired properties discussed herein which make such oxides superior to Ag and Cu for the applications of the present invention.

More specifically, highly conductive metal oxides having a conductivity >10,000 $ohm^{-1}$ $cm^{-1}$, and preferably a conductivity >50,000 $ohm^{-1}$ $cm^{-1}$, are suitable for the present invention.

The conductivities of the highly conductive metal oxides are clearly superior to conventional doped metal oxides, such as fluorine-doped tin oxide and tin-doped indium oxide, as can be seen in Table 1.

TABLE 1

| Material | Resistivity (μohm-cm) | Conductivity ($ohm^{-1}cm^{-1}$) |
|---|---|---|
| Ag | 1.6 | 590,000 |
| Cu | 1.7 | 625,000 |
| $ReO_3$ | 9-18 | 55,000-110,000 |
| $Na_{0.8}WO_3$ | 80 | 12,500 |
| $RuO_2$ | 40-100 | 10,000-25,000 |
| $SnO_2$:F | 400 | 2,500 |
| $In_2O_3$:Sn | 200 | 5,000 |

The films formed according to the present invention will, generally, have stoichometry corresponding to the stoichometric oxide of the corresponding metal, e.g., $SnO_2$, $TiO_2$, etc., however, films which are slightly oxygen deficient may also be produced, and may be useful.

Thin film structures utilizing a combination of the above-described dielectric and highly conductive metal oxides in a three-layer sequence have been found to exhibit an emissivity of <0.3, preferably <0.1, a visible light transmittance >70%, and a total solar energy transmittance of <60%. Preferably, the thin film structure will have a total solar energy transmittance <45%.

The chemical durability of the above-described thin film structures is significantly improved over conventional structures as, without wishing to be bound by any theory, the inventors believe the highly conductive metal oxide replacing the silver significantly reduces reaction of the film with ambient humidity, atmospheric contaminants, and the like. The inventors believe that replacement of the silver with a less reactive metal oxide improves the chemical stability of the film stack.

Similarly, the inventors believe that the mechanical durability of the thin film structure will be improved by replacing the ductile, malleable silver layer with a rigid, stiff metal oxide layer.

The thin film or coating of the present invention may be deposited on any suitable dielectric substrate material. A transparent glass, made by the float glass process, particularly a soda-lime-silica glass has been found to be suitable. Some tinted glasses may also be suitable.

The films of the present invention may be deposited on the aforementioned substrates by any suitable method, including various types of sputtering or CVD techniques. In particular, an on-line deposition process occurring during the float-glass manufacturing process is considered suitable. A particularly preferred on-line deposition process for the present invention is atmospheric pressure chemical vapor deposition.

An apparatus, useful for the on-line production of the coated glass article of the present invention, generally comprises a float section, a lehr, and a cooling section. The float section has a bottom which contains a molten tin bath, a roof, sidewalls, and end walls, which together form a seal such that there is provided an enclosed zone, wherein a non-oxidizing atmosphere is maintained, as hereinafter described in greater detail, to prevent oxidation of the tin bath. During operation of the apparatus, molten glass is cast onto a hearth, and flows therefrom under a metering wall, then downwardly onto the surface of the tin bath, from which it is removed by lift-out rolls and conveyed through the lehr, and thereafter through the cooling section.

A non-oxidizing atmosphere is maintained in the float section by introducing a suitable gas, such as for example one composed of 99 percent by volume nitrogen and 1 percent by volume hydrogen, into where the coating occurs, through conduits which are operably connected to a manifold. The non-oxidizing gas is introduced into the coating zone from the conduits at a rate sufficient to compensate for losses of the gas (some of the non-oxidizing atmosphere leaves the zone by flowing under the end walls), and to maintain a slight positive pressure, conveniently about 0.001 to about 0.01 atmospheres above ambient pressure. The tin bath and the enclosed zone are heated by radiant heat directed downwardly from heaters. The heat zone is generally maintained at a temperature of about 1200° F. The atmosphere in the lehr is typically air, and the cooling section is not enclosed. Ambient air is blown onto the glass by fans.

The apparatus also includes gas distributors located in the float zone. The desired precursor mixtures for the individual coatings are supplied to the respective gas distributors, which in turn direct the precursor mixtures to the hot surface of the glass ribbon. The precursors react at the glass surface to form the desired coatings.

Optionally, the thin film or coating of the present invention includes underlayers deposited between the glass substrate and induced transmission filter stack. The coatings are such as to provide a barrier to sodium diffusion from the glass into the coating or to provide neutral color in transmittance and reflectance when applied to a clear glass substrate.

The term "silver free", as used herein, is used to indicate that at most trace amounts of silver are present, i.e. less than 0.1 mol % silver.

U.S. Pat. No. 5,798,142 discloses a silica barrier layer and a float glass production process which may be used in embodiments of the present invention. US Pat. No. 5,798,142 is hereby incorporated by reference as if set forth in its entirety herein.

U.S. Pat. Nos. 4,187,336; 4,419,386 and 4,206,252 disclose color suppression layers which may be used in embodiments of the present invention. US Pat. Nos. 4,187,336; 4,419,386,and 4,206,252 are hereby incorporated by reference as if set forth in its entirety herein.

The following predictive examples show expected transmission in the visible range ($T_{vis}$) and transmission in the solar range ($T_{sol}$) according to the present invention. Glass thickness is given in inches and coating thicknesses are given in Angstroms.

| | Tvis | Tsol | Emissivity |
|---|---|---|---|
| glass(0.231)/175 SnO2/50 RuO2/200 SnO2 | 74 | 59 | |
| glass(0.231)/400 TiO2/300 RuO2/330 TiO2 | 71.5 | 40.2 | |
| glass(0.231)/250 TiO2/280 ReO3/250 TiO2 | 84 | 56.2 | 0.19 |

In accordance with the provisions of the patent statutes the present invention has been described in what is considered to represent its preferred embodiment. However, it should be noted that the invention can be practiced otherwise than as specifically illustrated and described without departing from its spirit or scope.

What is claimed is:

1. A coated glass article comprising:

a dielectric substrate;

a first dielectric metal oxide layer deposited over the dielectric substrate, the first dielectric metal oxide layer comprising an oxide of tin or titanium;

a first highly conductive silver free metal oxide layer deposited over the first dielectric metal oxide, the highly conductive metal oxide comprising an oxide of rhenium or ruthenium, having a thickness <1,000 Å and an electrical conductivity greater than 10,000 $ohm^{-1}$ $cm^{-1}$; and a second dielectric metal oxide layer deposited over the conductive, silver-free metal oxide layer, the second dielectric metal oxide layer comprising an oxide of tin or titanium;

wherein the coated glass article has an emissivity of *less than* 0.3, a visible light transmittance >70%, and a total solar energy transmittance of <60%.

2. The solar control coating defined in claim 1, wherein the first highly conductive metal oxide has an electrical conductivity greater than 50,000 $ohm^{-1}$ $cm^{-1}$.

3. The solar control coating defined in claim 1, wherein a second highly conductive silver-free metal oxide layer comprising an oxide of rhenium or ruthenium is deposited over the second dielectric metal oxide layer, and a third dielectric metal oxide layer comprising an oxide of tin or titanium is deposited over the second highly conductive silver-free metal oxide layer.

4. The coated glass article defined in claim 1, wherein the emissivity is <0.1.

5. The coated glass article defined in claim 1, wherein the highly conductive metal oxide comprises an oxide of ruthenium.

6. The coated glass article defined in claim 5, wherein:

the first dielectric metal oxide layer comprises $SnO_2$;

the first highly conductive silver free metal oxide layer comprises $RuO_2$; and the second dielectric metal oxide layer comprises $SnO_2$.

7. The coated glass article defined in claim 5, wherein:

the first dielectric metal oxide layer comprises $TiO_2$;

the first highly conductive silver free metal oxide layer comprises $RuO_2$; and the second dielectric metal oxide layer comprises $TiO_2$.

8. The coated glass article defined in claim 1, wherein the highly conductive metal oxide comprises an oxide of rhenium.

9. The coated glass article defined in claim 8, wherein:

the first dielectric metal oxide layer comprises $TiO_2$;

the first highly conductive silver free metal oxide layer comprises $ReO_3$; and the second dielectric metal oxide layer comprises $TiO_2$.

* * * * *